United States Patent [19]

Kumani et al.

[11] Patent Number: 4,927,651

[45] Date of Patent: May 22, 1990

[54] METHOD OF PRESERVING FOOD

[75] Inventors: Hiroo Kumani; Akio Okamoto, both of Yokohama, Japan

[73] Assignee: Kabushiki Kaisha Nasa, Kanagawa, Japan

[21] Appl. No.: 318,532

[22] Filed: Mar. 3, 1989

[30] Foreign Application Priority Data

Oct. 7, 1988 [JP] Japan ............................. 63-253412

[51] Int. Cl.$^5$ ............................................. A23L 3/26
[52] U.S. Cl. ................................ 426/324; 426/107; 426/234; 426/415; 426/542
[58] Field of Search ............... 426/107, 234, 423, 415, 426/324, 542, 541

[56] References Cited

U.S. PATENT DOCUMENTS

| | | | |
|---|---|---|---|
| 3,861,931 | 1/1975 | Taylor | 426/415 |
| 4,143,647 | 3/1979 | Hussleen | 426/234 |
| 4,741,915 | 5/1988 | Farr | 426/542 |
| 4,839,187 | 6/1989 | Mai | 426/542 |

FOREIGN PATENT DOCUMENTS

| | | | |
|---|---|---|---|
| 0142903 | 5/1985 | European Pat. Off. | 426/324 |
| 87-05247 | 10/1988 | France | 426/324 |
| 49-126773 | 4/1974 | Japan | 426/415 |
| 58-20149 | 2/1983 | Japan | 426/324 |
| 59-166585 | 9/1984 | Japan | 426/542 |
| 62-253363 | 11/1987 | Japan | 426/324 |
| 63-86757 | 4/1988 | Japan | 426/324 |
| 63-229118 | 9/1988 | Japan | 426/324 |
| 64-33300 | 2/1989 | Japan | 426/234 |
| 1136350 | 2/1967 | United Kingdom | 426/415 |

*Primary Examiner*—Carolyn Paden
*Attorney, Agent, or Firm*—Jones, Tullar & Cooper

[57] ABSTRACT

Disclosed is a food preserving method comprising the steps of: adding to the food plant extracts containing flavonoids and/or polyphenols; wrapping the food with a food wrapping material which is capable of radiating far infrared rays and absorbing ethylene gas; and keeping the wrapped food at a relatively low temperature. The far infrared radiating ceramic causes the activation of the enzyme in the food; elimination of ethylene gas and other undesired gas from the food; and sterilization of the food. The plant extract applied to the food prevents the oxidation of the food. The cooperative effect of the wrapping material and the plant extract applied to the food assures that discoloration, appearance of oil or fat on the food surface, water dripping and degradation of taste are prevented for an elongated period.

27 Claims, No Drawings

METHOD OF PRESERVING FOOD

BACKGROUND OF THE INVENTION

1. Field of the Invention

The present invention relates to method of preserving fresh meat, fish, ham, sausage and other artificial food products mainly containing meat and fish.

2. Description of the Prior Art

As a conventional method of preserving fresh meat and fish it is known to add extracts to the food to be preserved ( the plant extracts containing flavonoids or polyphenols, which function as an antioxidant, sterilization agent and deoderizing agent ) and the food placed in a container, and put in a cool place. The conventional food preserving method uses natural substances as additives, and therefore there is no fear of causing an ill effect on the health of the body. But, the intended antioxidizing effect, is caused only on the surface of the food, while the oxidization of the undersurface part of the food cannot be attained. Therefore, the food cannot be preserved for a long period. In an attempt to assure the undersurface oxidization the use of antioxidant chemicals was proposed, but this reliance is not appropriate for the health of the body.

Still disadvantageously, the conventional food preserving method cannot prevent the food surface from browning with time.

SUMMARY OF THE INVENTION

The object of the present invention is to provide a food preserving method which is capable of preserving food in a fresh condition for a long period without discoloring. The food preserved according to the present invention will cause no harmful effect on the health of the body.

To attain this object a food preserving method according to the present invention comprises the steps of: adding to the food, plant extracts containing flavonoids and/or polyphenols; wrapping the food with a food wrapping material which is capable of radiating far infrared rays and absorbing ethylene gas; and keeping the wrapped food at a relatively low temperature. The food wrapping material comprises a thermoplastic with a far infrared radiating ceramic added. The far infrared radiating ceramic essentially contains silicon dioxide, aluminum oxide, magnesium oxide and silver oxide. The thermoplastic may be polyethylene, polypropylene or styrene. The far infrared radiating ceramic is pulverized, and the thermoplastic has such ceramic particles embedded and partly exposed. The ceramic particle is porous, and is about 0.5 microns across.

In use, the wrapping material radiates far infrared rays to the wrapped food to activate the enzyme in the food. Also, the wrapping material absorbes ethylene gas from the food. Thus, the wrapping material has a positive effect to keep the freshness of the food deeply inside.

Also, the wrapping material prevents the exposure of the food to the surrounding air, thereby preventing the degradation of polyphenols, which are applied to the surface of the food to function as an antioxidant. Accordingly, the discoloration of the wrapped food can be prevented for an long period.

The cooperative effect caused by the additive to the food and the wrapping material assures that the freshness of the food is preserved for an long period.

DETAILED DESCRIPTION

First, a wrapping material which is used in a food preserving method according to the present invention, is described.

The food wrapping material comprises a thermoplastic such as polyethylene, polypropylene or styrene with a far infrared radiating ceramic added. The far infrared radiating ceramic essentially contains silicon dioxide $SiO_2$, aluminum oxide $Al_2O_3$, magnesium oxide MgO and silver oxide $Ag_2O$. Such ceramic is made of a selected substance occuring in nature, and therefore it may have unwanted ingredients such as ferric oxide $Fe_2O_3$, calcium oxide CaO, potassium oxide $K_2O$ or sodium oxide NaO. These may be inevitably contained. One example of a wrapping material is given in following Table:

| ingredients | ratios(%) |
| --- | --- |
| $SiO_2$ | 70–90 |
| $Al_2O_3$ | 5–10 |
| $Fe_2O_3$ | 0.5–1.5 |
| CaO | 0.5–1.0 |
| MgO | 0.1–0.3 |
| $TiO_2$ | 1.0–1.5 |
| $K_2O$ | 2.0–3.0 |
| NaO | 2.0–3.0 |
| $Ag_2O$ | 0.001–0.005 |
| $Ni_2O_3$ | 1.5–2.0 |

Among these substances $Ag_2O$ and $Ni_2O_3$ have a sterilization effect on the food.

Now, a method of making such a food wrapping material is described:

A far infrared radiating ceramic containing the substances as shown in the table, is added to a thermoplastic material such as polyethylene, polypropylene or styrene. Then, the thermoplastic is soaked in fresh water or sea water to subject it to an ion-exchange treatment.

The thermoplastic material thus treated is used to make film, sheet, bags or containers to meet the requirements of wrapping particular foods, depending on the manner in which such foods are stored.

The ion-exchange process in sea water permits the transfer of chloride ions Cl from MgCl in the sea water to the thermoplastic, thereby imparting a sterilizing capability.

The wrapping material has the following effects:

(1) Control of the activation of the enzyme in the food

The far infrared radiating ( wave length ranging from 6 to 11 microns ) was detected from the wrapping material at room temperature.

This radiation has the effect of activating water molecules in the food. Also, it has an activation effect on the enzyme in the organic substance.

(2) Elimination of unwanted gases and consequential control of activation of the enzyme in the food Elimination of ethylene gas, amine gas, carbon dioxide and other unwanted gases from the food was discerned, and the activation of the enzyme in the food was discerned, too.

(3) Control of the temperature and moisture of the wrapped food

Bags were made of the wrapping material, and such bags were put in a refrigerator to make an observation as to how the temperature and the moisture ( water content ) in the bags varied with time. It was found that the moisture reached a constant value after an elapse of a certain length of time.

(4) sterilization

Trapped air and gases were oxidized to produce oxidized ethylene gas. The sterilization effect by the oxidized ethylene gas on the food was discerned.

(5) Prevention of ultraviolet rays

Coloring the wrapping material with appropriate dyes was found to be useful in preventing invasion of ultraviolet rays.

(6) Other advantages

The far infrared radiating ceramic in the wrapping material had an effect of preventing the temperature rise in the incinerator or trash burner when used wrapping material was burnt, thus causing no damage on the incinerator. Also, advantageously generation of poisonous gas was suppressed.

Now, a food preserving method according to the present invention is described:

Assume that fresh meat, fish, ham and sausage made of meat or fish is preserved. First, an aqueous solution containing a plant extract of 0.1 –1% by volume is prepared. The plant extract used contains flavonoids and/or polyphenols. It may be extracted from mulberry or tea plant. Catechin, flavone, anthocyanin and other flavonoids may be contained. Also, chlorogenic acid, gallic acid and other polyphenols may be contained.

Then, the aqueous solution is sprayed an a food to be preserved. Otherwise, the food is soaked in the aqueous solution. Then, the so treated food is wrapped with the wrapping material as described above.

The wrapped food is stored at a relatively low temperature, particularly in a refrigerator.

While storing, the wrapping material radiates far infrared rays to the wrapped food to activate the enzyme in the food and absorb ethylene gas from the food. Thus, the freshness of the food can be kept deep inside.

The wrapping material prevents the exposure of the food to the surrounding air, thereby preventing the degradation of the polyphenol ( antioxidant ) applied to the surface of the food. Accordingly the discoloration of the food surface is prevented.

The cooperative effect of the wrapping material and the plant extract applied to the food assures that discoloration, appearance of oil or fat on the food surface, water dripping and degradation of taste are prevented for an elongated period.

What is claimed is:

1. A method of preserving food, comprising the steps of: adding to the food an aqueous solution containing a plant extract of 0.1 to 1% by volume containing flavonoids; preparing a wrapping material from a thermoplastic to which a far infrared radiating ceramic is added;; wrapping the food with the wrapping material, which is capable of radiating far infrared rays and absorbing ethylene gas; and maintaining the wrapped food at a low temperature.

2. The method of preserving food according to claim 1, wherein said far infrared radiating ceramic essentially contains silicon dioxide, aluminum oxide, magnesium oxide and silver oxide.

3. A method of preserving food according to claim 2 wherein said thermoplastic comprises polyethylene, polypropylene or styrene.

4. A method of preserving food according to claim 2 wherein said far infrared radiating ceramic is granulous and porous, and said thermoplastic has ceramic particles embedded and partly exposed.

5. A method of preserving food according to claim 4 wherein the average particle of said far infrared radiating ceramic is 0.5 microns across.

6. A method of preserving food according to claim 3 wherein said far infrared radiating ceramic is granulous and porous, and said thermoplastic has ceramic particles embedded and partly exposed.

7. A method of preserving food according to claim 6 wherein the average particle of said far infrared ceramic is 0.5 microns across.

8. The method of preserving food according to claim 1, wherein the aqueous solution is added by spraying onto the food.

9. The method of preserving food according to claim 1, wherein the aqueous solution is added by soaking the food in the aqueous solution.

10. A method of preserving food, comprising the steps of: adding to the food an aqueous solution containing a plant extract of 0.1 to 1% by volume containing flavonoids and polyphenols; preparing a wrapping material from a thermoplastic to which a far infrared radiating ceramic is added; wrapping the food with the wrapping material, which is capable of radiating far infrared rays and absorbing ethylene gas; and maintaining the wrapped food at a low temperature.

11. The method of preserving food according to claim 10, wherein said far infrared radiating ceramic essentially contains silicon dioxide, aluminum oxide, magnesium oxide and silver oxide.

12. The method of preserving food according to claim 11, wherein said far infrared radiating ceramic is granulous and porous, and said thermoplastic has ceramic particles embedded and partly exposed.

13. The method of preserving food according to claim 12, wherein the average particle of said far infrared radiating ceramic is 0.5 microns across.

14. The method of preserving food according to claim 11, wherein said thermoplastic comprises polyethylene, polypropylene or styrene.

15. The method of preserving food according to claim 14, wherein said far infrared radiating ceramic is granulous and porous, and said thermoplastic has ceramic particles embedded and partly exposed.

16. The method of preserving food according to claim 15, wherein the average particle of said far infrared radiating ceramic is 0.5 microns across.

17. The method of preserving food according to claim 10, wherein the aqueous solution is added by spraying onto the food.

18. The method of preserving food according to claim 10, wherein the aqueous solution is added by soaking the food in the aqueous solution.

19. A method of preserving food, comprising the steps of: adding to the food an aqueous solution containing a plant extract of 0.1 to 1% by volume containing polyphenols; preparing a wrapping material from a thermoplastic to which a far infrared radiating ceramic is added; wrapping the food with the wrapping material, which is capable of radiating far infrared rays and absorbing ethylene gas; and maintaining the wrapped food at a low temperature.

20. The method of preserving food according to claim 19, wherein said far infrared radiating ceramic essentially contains silicon dioxide, aluminum oxide, magnesium oxide and silver oxide.

21. The method of preserving food according to claim 20, wherein said far infrared radiating ceramic is granulous and porous, and said thermoplastic has ceramic particles embedded and partly exposed.

22. The method of preserving food according to claim 21, wherein the average particle of said far infrared radiating ceramic is 0.5 microns across.

23. The method of preserving food according to claim 20, wherein said thermoplastic comprises polyethylene, polypropylene or styrene.

24. The method of preserving food according to claim 23, wherein said far infrared radiating ceramic is granulous and porous, and said thermoplastic has ceramic particles embedded and partly exposed.

25. The method of preserving food according to claim 24, wherein the average particle of said far infrared radiating ceramic is 0.5 microns across.

26. The method of preserving food according to claim 19, wherein the aqueous solution is added by spraying onto the food.

27. The method of preserving food according to claim 19, wherein the aqueous solution is added by soaking the food in the aqueous solution.

* * * * *

UNITED STATES PATENT AND TRADEMARK OFFICE
CERTIFICATE OF CORRECTION

PATENT NO. : 4,927,651

DATED : May 22, 1990

INVENTOR(S) : Kumami et al

It is certified that error appears in the above-identified patent and that said Letters Patent is hereby corrected as shown below:

Claim 1, column 3, line 65, the ";" (second occurrence) should be deleted.

Claim 7, column 4, line 20, "radiating" should be inserted between "infrared" and ceramic".

Signed and Sealed this

Fourth Day of June, 1991

Attest:

HARRY F. MANBECK, JR.

*Attesting Officer*

*Commissioner of Patents and Trademarks*